(12) United States Patent
Cooper et al.

(10) Patent No.: US 7,240,196 B2
(45) Date of Patent: Jul. 3, 2007

(54) METHOD AND SYSTEM FOR PROTECTING OWNERSHIP RIGHTS OF DIGITAL CONTENT FILES

(75) Inventors: Robin Ross Cooper, La Mesa, CA (US); Robert T. Kulakowski, Santa Fe, CA (US)

(73) Assignee: Verimatrix, Inc., San Diego, CA (US)

( * ) Notice: Subject to any disclaimer, the term of this patent is extended or adjusted under 35 U.S.C. 154(b) by 536 days.

(21) Appl. No.: 10/177,263

(22) Filed: Jun. 19, 2002

(65) Prior Publication Data

US 2003/0093665 A1 May 15, 2003

Related U.S. Application Data

(60) Provisional application No. 60/300,168, filed on Jun. 22, 2001.

(51) Int. Cl.
*H04L 29/00* (2006.01)
(52) U.S. Cl. .......................... 713/156; 705/51
(58) Field of Classification Search ............... 713/156; 705/51
See application file for complete search history.

(56) References Cited

U.S. PATENT DOCUMENTS

| | | | |
|---|---|---|---|
| 5,613,004 A * | 3/1997 | Cooperman et al. | 380/28 |
| 5,889,868 A | 3/1999 | Moskowitz et al. | |
| 6,026,166 A | 2/2000 | Le Bourgeois | |
| 6,385,596 B1 | 5/2002 | Wiser et al. | |
| 6,574,609 B1 * | 6/2003 | Downs et al. | 705/50 |
| 6,735,699 B1 | 5/2004 | Sasaki et al. | |
| 6,804,779 B1 | 10/2004 | Carroni et al. | |
| 6,978,020 B2 * | 12/2005 | Taniguchi et al. | 380/201 |
| 2001/0051996 A1 | 12/2001 | Cooper et al. | |

OTHER PUBLICATIONS

Chi, Chi-Hung et al., "Automatic Proxy-Based Watermarking for WWW" Computer Communications, Elsevier Science Publishers BV, Amsterdam, NL, 24(2), 144-154 (Feb. 2001).

* cited by examiner

*Primary Examiner*—David Y. Jung
*Assistant Examiner*—Andrew L Nalven
(74) *Attorney, Agent, or Firm*—Procopio, Cory, Hargreaves & Savitch

(57) ABSTRACT

A system and method for providing protection of ownership rights of digital content files while also providing distribution of the content files to consumers that are authorized to receive the digital content files. A system and method for preventing or deterring the unauthorized distribution of digital content files. Several possible protection schemes include, for example, proactive protections such as encryption, SSL or VPN technologies, and reactive protections such as watermarking, PKI, piracy watch systems, or legal action management.

4 Claims, 23 Drawing Sheets

Growth of the ROCA/DCA Network

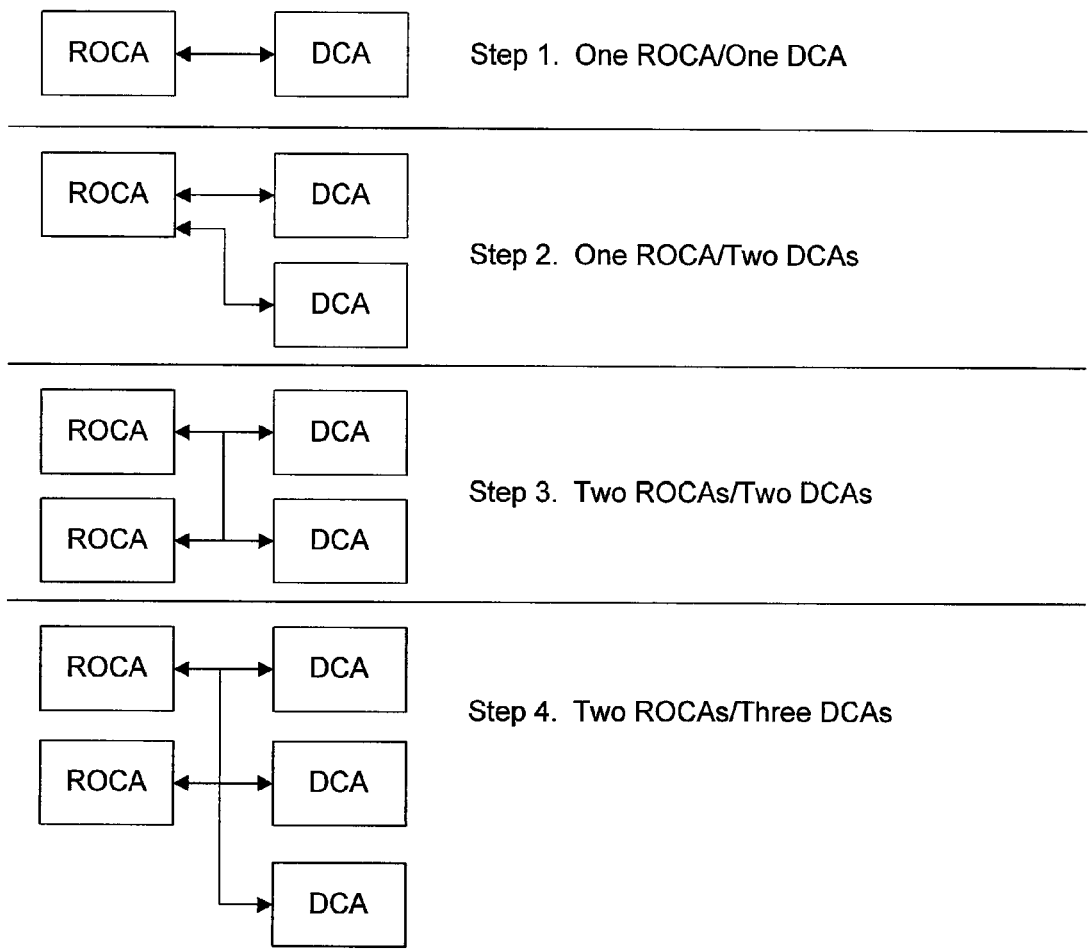
Note: Network continues to grow exponentially
Figure 1: Growth of the ROCA/DCA Network

Verimatrix Transaction Server is responsible for issuing watermark transactions id's and storing the watermark keys payload and signed message digest of the watermark key.

Rights Owner Content Authority is responsible for distributing content to DCA systems after watermarking for content with a unique key that identifies the DCA it was sent to.

Distribution Content Authority retrieves original content from the ROCA systems and distributes content to the content requestors after watermarking each content file with a unique watermark that identifies the content requestor.

ROCA Console is the GUI application that the operator uses to interface with the ROCA server. Allows the operator to load content, approve DCA systems for sales, and generate statistical reporting.

DCA console is the GUI application that the operator uses to interface with the DCA server. Allows the operator to load content from the ROCA is set minima inventory levels and generate statistical reporting.

Content Requestor would typically be the web server requesting the content from the DCA via https request. The content requestor may be required to have a VCA certificate installed in order to request content from the DCA.

The VCA uses Open SSL for issuing PKI certificates as well as the encryption routines. Certificates are created using 2048 bit public/private key pairs. The key pairs are created on the requesting server, i.e. VTS, ROCA, or DCA.

When the ROCA server is first installed the ROCA console must sign up fro a digital certificate before the ROCA server can issue content.

ROCA Signup

1100

Now that the ROCA server has been given a digital certificate it registers with the VTS indicating it is available for DCA's to contact.

ROCA Initialization

1300

The ROCA server is now online but does not have any content to distribute. The operator at the ROCA console must now load content into the ROCA server database.

The ROCA server is now online and waiting for DCA requests. Unfortunately there are no DCA's in existence so we now install the first DCA.

Now that the DCA server has been given a digital certificate it must be told which ROCA servers to download content from. The operator at the DCA console retrieves the content list from available ROCA's and instructs the DCA to request content from the ROCA server.

The ROCA server created a new 524 byte watermark Key and creates a digital signature using it and the ROCA private key. The ROCA then sends the request fro a new transaction to VTS along with key and signatures. The VTS returns a unique 44 bit transaction id to the ROCA which the retrieves the requested song from the database decrypts it, watermarks it using the watermark key and the 64 bit transaction id. The watermarked song is then returned to the DCA.

FIG. 21

Now that the DCA server has been given a list of songs it must maintain a certain number of these songs in stock. The DCA analyzes the min/max levels for each song. If a song is at or below its min. level, it begins the watermarking process by decrypting a copy of the master song and creating a copy of the song with a pre-encoded watermark. Once the song is pre-encoded with a watermark, it is encrypted using the DCA's public key and stored in the stock table for future use.

FIG. 22

Now that the DCA server has songs in the inventory, it can accept requests from Content Requestors (CR) to distribute contents. CR's may be required to have their own PKI certificate issued by Vertimatrix to identify them as the content owner when requesting a song. This is not a requirement today but is easily added. To add this requirement the CR is given a watermark key to digitally sign when it requests a song from the DCA. The DCA then send the watermark key and the digital signature to the VTS, which stores the signature and watermark key in the transaction database and returns the transaction id to the DCA. The DCA then post-encodes the watermark in the content using the 524 byte watermark key and 64 bit transaction id.

FIG. 23

Encrypted objects stored on each components is accomplished using 3DES symmetric encryption with the 3DES encryption key enveloped in the object and encrypted using the public key of the requestor. This prevents anyone but the holder of the private key from decrypting the objects.

FIG. 24

This would be the same method used to store content for the client device in a DRM mode. All content would be 3DES encrypted using the client devices public key, preventing all but the holder of the private key from reading and decrypting the content.

FIG. 25

METHOD AND SYSTEM FOR PROTECTING OWNERSHIP RIGHTS OF DIGITAL CONTENT FILES

RELATED APPLICATIONS

This application claims priority to U.S. provisional Application No. 60/300,168, filed Jun. 22, 2001 which is hereby incorporated by reference.

This application incorporates by reference U.S. application Ser. No. 09/782,707, filed Feb. 12, 2001 and titled "WEB BASED HUMAN SERVICES CONFERENCING NETWORK," and U.S. application Ser. No. 09/789,298, filed Feb. 20, 2001 and titled "NETWORK-BASED CONTENT DISTRIBUTION SYSTEM."

BACKGROUND OF THE INVENTION

1. Field of the Invention

The present invention relates to the field of digital content file distribution. Additionally, the invention relates to protecting the ownership rights in digital information, providing for authorized distribution of the digital information to consumers, and protecting against unauthorized distribution.

2. Description of the Related Art

The use of the Internet and the World Wide Web as tools for content delivery and e-commerce has increased dramatically in recent years. As a consequence, the delivery of digital content materials, for example music, videos, software, books, multi-media presentations, images, and other electronic media, over a network to one or more consumers has likewise increased dramatically. Users may download such digital content files legitimately from a content provider, for example a record label such as Sony Records or Capitol Records, or inappropriately from one of the content download services without the permission of the copyright owner. Using a network such as the Internet, users may, and quite frequently do, transfer digital media files they have downloaded, whether legitimately or otherwise, to others.

In this way, consumers of digital content information may simply and freely distribute such media information over a public network such as the Internet without the permission of the copyright owner (or other property rights owners). Such consumers who inappropriately distribute copyright material over public networks cannot currently be positively identified, if they can even be tracked down at all. Therefore, these consumers can quite often successfully deny culpability.

A prevalent concern within the media publishing and/or distribution business is that the supply vs demand equation that drives the economics of valuable goods and services no longer applies to digital content. Since a digital media file such as a music or movie file can be duplicated essentially an unlimited number of times and distributed at virtually no cost, the economics for providing such digital materials to the public is not viable. In order to return the supply versus demand equation back to the digital media domain, individual digital media files must be configured in such a way as to give them properties similar to physical objects. With such physical properties, these files can be handled and monitored in ways that are similar to physical objects, thus allowing the return of the necessary economic incentives and viability.

Although encryption schemes have provided solutions to other problems involving digital media content, it is not a viable answer to the problem of identifying and monitoring content files. Consumers might possibly have embraced encryption of digital media files had it been introduced on a large scale before the Napster file-sharing model. Consumers generally will learn to accept models that add a level of complexity if these models are in fact the only models available. However, the complexities that content distributors would like to introduce into the market with encryption will arrive after the superior model has been introduced. This will likely result in media content file protection schemes such as encryption and copy protection disappearing over time.

SUMMARY OF THE INVENTION

The solution to the numerous problems confronting the rights owners of digital content is, therefore, not simply an issue of adding encryption. It is more properly an issue of uniquely marking and identifying digital content files with authenticated information from a trusted authority and providing protection for the ownership rights of such content files while allowing for authorized distribution of the content. Therefore, there is a need in the electronic content distribution field for a system and method of distributing authorized content files from rights owners to consumers while protecting the ownership rights in such files and preventing or hindering the unauthorized distribution of content files.

One aspect of this invention relates to a system for protecting the ownership rights of digital content files distributed to consumers comprising a certificate authority configured to issue and maintain digital certificates, a transaction server configured to issue watermark transaction identifiers and store a first watermark generated from said digital certificates, a rights owner content authority configured to receive said first watermark and distribute a digital content file that includes said first watermark, a distribution content authority configured to receive said digital content file, generate a second watermark that identifies a content requester, and distribute the digital content file that includes said second watermark, and a content requester configured to receive said digital content file that includes said first and second watermarks and distribute said digital content file to an authorized consumer.

An additional aspect of this invention relates to a method for protecting the ownership rights of digital content files distributed to consumers comprising issuing and maintaining a digital certificate, issuing watermark transaction identifiers, generating a first watermark from said digital certificate, and storing said first watermark, distributing a digital content file that includes said first watermark, generating a second watermark that identifies a content requestor and distributing the digital content file that includes said second watermark, and distributing said digital content file that includes said first and second watermarks to an authorized consumer.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate various embodiments of the invention, and not to limit the scope of the invention.

FIG. 1 is a block diagram illustrating one embodiment of a possible growth of a content authority network.

FIG. 21 is a flow diagram illustrating another embodiment of the distribution content authority inventory load operation shown in FIGS. 19 and 20.

FIG. 22 is a block diagram illustrating another embodiment of the distribution content authority shown in FIG. 5.

FIG. 23 is a block diagram illustrating another embodiment of the content requestor shown in FIG. 8.

FIG. 24 is a block diagram illustrating another embodiment of the various components of the content distribution system shown in FIGS. 2 through 8.

FIG. 25 is a block diagram illustrating another embodiment of the content requestor shown in FIG. 8.

DETAILED DESCRIPTION

Definitions

Figure 1A:
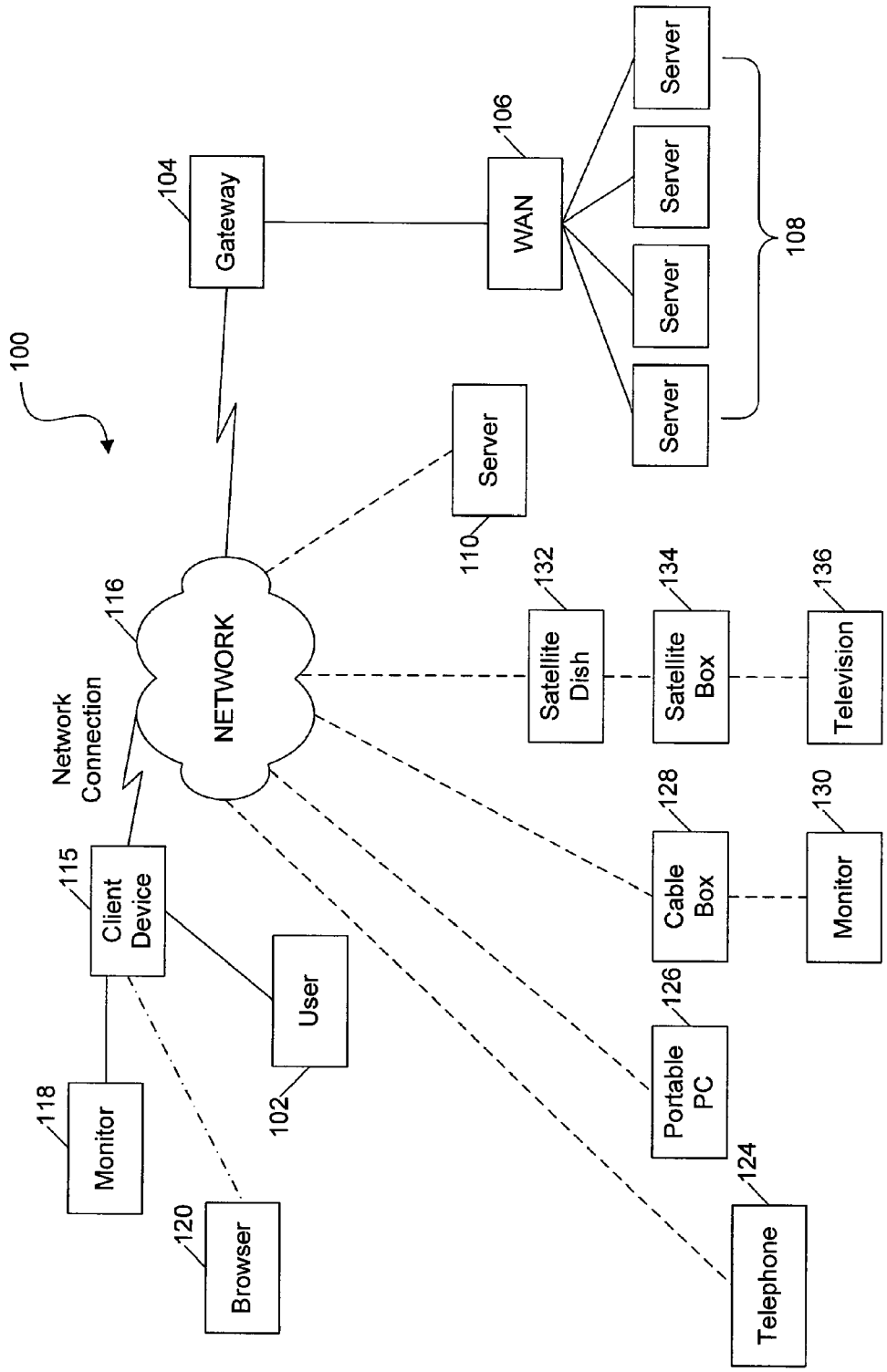
FIG. 1A is a diagram of one example of a network configuration in which this invention may operate.

The following provides a number of useful possible definitions of terms used in describing certain embodiments of the disclosed invention.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers. The files and programs are accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may comprise that which is presented by a standard web browser in response to an HTTP request specifying the URL by which the web page file is identified. A web page can include, for example, text, images, sound, video, and animation.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, any of the versions of Microsoft Windows, Apple MacOS, IBM OS/2 or other operating system. The appropriate operating system may include a communications protocol implementation that handles all incoming and outgoing message traffic passed over the Internet. In other embodiments, while the operating system may differ depending on the type of computer, the operating system will continue to provide the appropriate communications protocols to establish communication links with the Internet.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

Authentication may refer to making it possible for the receiver of a message or file to ascertain its origin, so that an intruder should not be able to masquerade as someone else.

Description of Certain Inventive Aspects

In one embodiment, encryption or protection methods or systems are referred to as proactive protection. Proactive protection processes include, but are not limited to, the following:
  Encryption of digital information
  Secure Sockets Layer (SSL), or other such security means while transmitting digital information
  Virtual Private Network (VPN) technologies
  Other such protection or scrambling mechanisms In one embodiment, there are also means to protect the rights owners of digital information if either no proactive protection mechanisms are deployed or if a hacker successfully breaks the proactive protection mechanisms. These mechanisms to protect rights owners from inappropriate or illegal distribution of digital information over a network are referred to as reactive protections. Reactive protection processes include, but are not limited to, the following:
  Watermarking
  Public Key Infrastructure (PKI)
  PKI/Watermarking
  Authentication
  Piracy Watch Systems
  Legal Action Management
  Other such after distribution protection mechanisms In one embodiment of a digital content distribution network, there may be three entities involved as follows:
  1.) The rights owners of the digital content information
  2.) The distributors of digital content information, for example a website, cable provider, wireless provider, or other digital content distributors
  3.) The end user or consumer In certain embodiments, the rights owner of the digital content information may also be the distributor of the content. In order to provide a system that provides proactive and reactive protection technologies within a digital content distribution system, it may be desirable to develop independent systems or modules for each of the entities mentioned above, i.e. rights owners, distributors, and end users. The three systems or modules may be connected in such a way as to communicate with one another and provide the desirable or needed protection mechanisms.

The three systems or modules mentioned above may be respectively referred to as follows:
  1.) Rights Owners Content Authority (ROCA)
  2.) Distributor Content Authority (DCA)
  3.) Client or Consumer Device In one embodiment, the ROCA is a system or module that provides rights owners the capability to manage their digital information as it is being distributed over a network. In this embodiment, proactive and reactive technologies are available to a rights owner once the rights owner begins using a ROCA system or module.

In another embodiment, the DCA is a system or module that provides distributors the capability to obtain digital information from rights owners and transmit this information to the end user in a manner that provides proactive and reactive protection that matches the requirements established by the ROCA system.

In a further embodiment, the client or consumer device connects to the content distribution system, for example a website, cable provider, or wireless provider, and additionally accesses digital information via the DCA.

One or more ROCA systems may optionally be connected to one or more DCA systems. Therefore, in this manner, a flexible and expandable network of ROCA and DCA systems may be created. An appropriate analogy, for the sake of example only, is that of a banking ATM network. Banks remain independent, however they may be connected via the Star System ATM network, and therefore share or distribute resources. An example of one way such a network might be configured can be found below in relation to FIG. 1.

In one embodiment, the ROCA and DCA systems or modules are created in such a way as to simulate a physical inventory of digital content. For example, if a distributor predicts that 100 content files will be distributed within a predetermined time frame, the distributor may instruct his DCA unit to purchase at least 100 units from the appropriate ROCA unit during that period of time. After these 100 units are transmitted from the ROCA unit to the DCA, the DCA will have exhausted its entire inventory and additional units are typically ordered. In this embodiment, the proactive and reactive technologies are deployed to insure that a minimum number of copies of the content files are distributed to the public inappropriately. By utilizing such a system, the supply vs. demand equation is likely to be returned to digital media distribution over a network.

In another embodiment, in order to minimize the chance of experiencing the problem relating to the difficulty in providing digital information files to thousands or even millions of end user or consumers at approximately the same time, the distributor is responsible for providing a scaling solution. To provide such a scaling content distribution system, the distributor may deploy and maintain cache servers that are capable of effectively storing and transmitting digital content files to the end user or consumer upon the control of the distributor. Such a content distribution network therefore is capable of providing DCA systems for each cache server. To effectively scale using such a ROCA/DCA network, additional DCA units may be added to each cache that is available to the distributor.

In the case where large demands are made on the ROCA or DCA units, for example as a result of many large digital content files being distributed over the network, server farms may be configured for ROCA, DCA or transaction servers for example. In configuring such server farms, it is possible to reduce overload conditions and provide a highly scalable network. A server farm is essentially a group of networked servers housed in one location. A server farm streamlines internal processes by distributing the workload between the individual components of the farm and expedites computing processes by harnessing the power of multiple servers. The server farms typically utilize load-balancing software that performs such tasks as tracking demand for processing power from different machines, prioritizing the tasks, and scheduling and rescheduling them depending on priority and demand that users put on the network. In addition, when one server in the farm fails, another may step in as a backup.

In another embodiment, the ROCA system employs a Graphical User Interface (GUI), which allows rights owners to set a number of preference and option settings that provide the rights owner with confidence and comfort in making digital content available to end users or consumers through distribution. Similarly, a GUI for the DCA system allows the distributor to access a large number of ROCA units in an effort to increase the number and quality of digital content files that are readily available via the network.

In an effort to verify and audit the ROCA/DCA network for accuracy and its protection from piracy, it is possible to build and deploy an independent system that appears to be an end user or consumer and purchases digital content files over such a ROCA/DCA network. When purchases are made by such an auditing system or module, it is possible to send the results to both the ROCA and DCA units in order to further the audit process.

Description of the Figures

Although content files are referred to as songs in the following figures, each occurrence of the term "songs" in the figures may be substituted with the term "content files" to more precisely depict the corresponding systems or methods.

FIG. 1A is a diagram of one example of a network configuration 100 in which this invention may operate. However, various other types of electronic devices communicating in a networked environment may also be used. A user 102, which may be a consumer or any other recipient of content files, communicates with a computing environment, which may include multiple server computers 108 or a single server computer 110 in a client/server relationship on a network communication medium 116. In a typical client/server environment, each of the server computers 108, 110 may include a server program that communicates with a client device 115, which may be a personal computer (PC), a hand-held electronic device, a mobile or cellular phone, a TV set or any number of other electronic devices.

The server computers 108, 110, and the client device 115 may each have any conventional general purpose single- or multi-chip microprocessor, for example a Pentium® processor, a Pentium® Pro processor, a 8051 processor, a MIPS® processor, a Power PC® processor, an ALPHA® processor, or other processor. In addition, the microprocessor may be any conventional special purpose microprocessor such as a digital signal processor or a graphics processor. Additionally, the server computers 108, 110 and the client device 115 may be desktop, server, portable, hand-held, set-top, or any other desired type of device. Furthermore, the server computers 108, 110 and the client device 115 each may be used in connection with various operating systems, including, for example, UNIX, LINUX, Disk Operating System (DOS), VxWorks, PalmOS, OS/2, Windows 3.X, Windows 95, Windows 98, and Windows NT.

The server computers 108, 110 and the client device 115 may each include a network terminal equipped with a video display, keyboard and pointing device. In one embodiment of the network configuration 100, the client device 115 includes a network browser 120 used to access the server computer 110. The network browser 120 may be, for example, Microsoft Internet Explorer or Netscape Navigator.

The user 102 at the client device 115 may utilize the browser 120 to remotely access the server program using a keyboard and/or pointing device and a visual display, such as a monitor 118. Although FIG. 1 shows only one client device 115, the network configuration 100 may include any number of client devices.

The network 116 may be any type of electronic transmission medium, for example, including but not limited to the following networks: a virtual private network (hereinafter VPN), a public Internet, a private Internet, a secure Internet, a private network, a public network, a value-added network, an intranet, or a wireless gateway. The term "Virtual Private Network" (VPN) refers to a secure and encrypted communications link between nodes on the Internet, a Wide Area Network (WAN), Intranet, or any other network transmission means. While the VPN nodes may communicate with each other, it is virtually impossible for a hacker to either comprehend the meaning of the signals or send signals that are believed to be authentic. One example of a secure communications technology that is designed to facilitate a VPN is the Secure Sockets Layer (SSL). It is contemplated by this application that there may be much better techniques other than SSL that may be deployed in order to scramble the data for content downloads. It is well known in the industry that other extremely effective scrambling techniques exist and are commonly used. Although SSL is a transport protocol, other scrambling techniques that are not transport protocol may be utilized. The non-SSL techniques may simply be techniques that will quickly and efficiently scramble and likewise unscramble the data that is being transmitted via the network.

While a VPN may be conducted on a private network, it may additionally be conducted on a public network as well. A VPN may include, for example, one or more client devices connected to a combination of web server(s), video archive server(s), source server(s), or Multi-Point Control Units (MCUs), which are secured using state-of-the-art security technologies.

In addition, the connectivity to the network may be, for example, via a remote modem, Ethernet (IEEE 802.3), Token Ring (IEEE 802.5), Fiber Distributed Datlink Interface (FDDI) or Asynchronous Transfer Mode (ATM). The network 116 may additionally connect to the client device 115 by use of a modem or by use of a network interface card that resides in the client device 115. The server computers 108 may be connected via a wide area network 106 to a network gateway 104, which provides access to the wide area network 106 via a high-speed, dedicated data circuit.

Devices other than the hardware configurations described above may be used to communicate with the server computers 108, 110. If the server computers 108, 110 are equipped with voice recognition or DTMF hardware, the user 102 may communicate with the server computers by use of a telephone 124. Other examples of connection devices for communicating with the server computers 108, 110 include a portable personal computer (PC) 126 with a modem or wireless connection interface, a cable interface device 128 connected to a visual display 130, or a satellite dish 132 connected to a satellite receiver 134 and a television 136. Still other methods of allowing communication between the user 102 and the server computers 108, 110 are contemplated by this application.

Additionally, the server computers 108, 110 and the client device 115 may not necessarily be located in the same room, building or complex. In fact, the server computers 108, 110 and the client device 115 could each be located in different physical locations, for example in different cities, states or countries. This geographic flexibility which networked communications allows is within the contemplation of this application.

FIG. 1 is a block diagram illustrating one embodiment of a possible growth of a content authority network.

Figure 2:
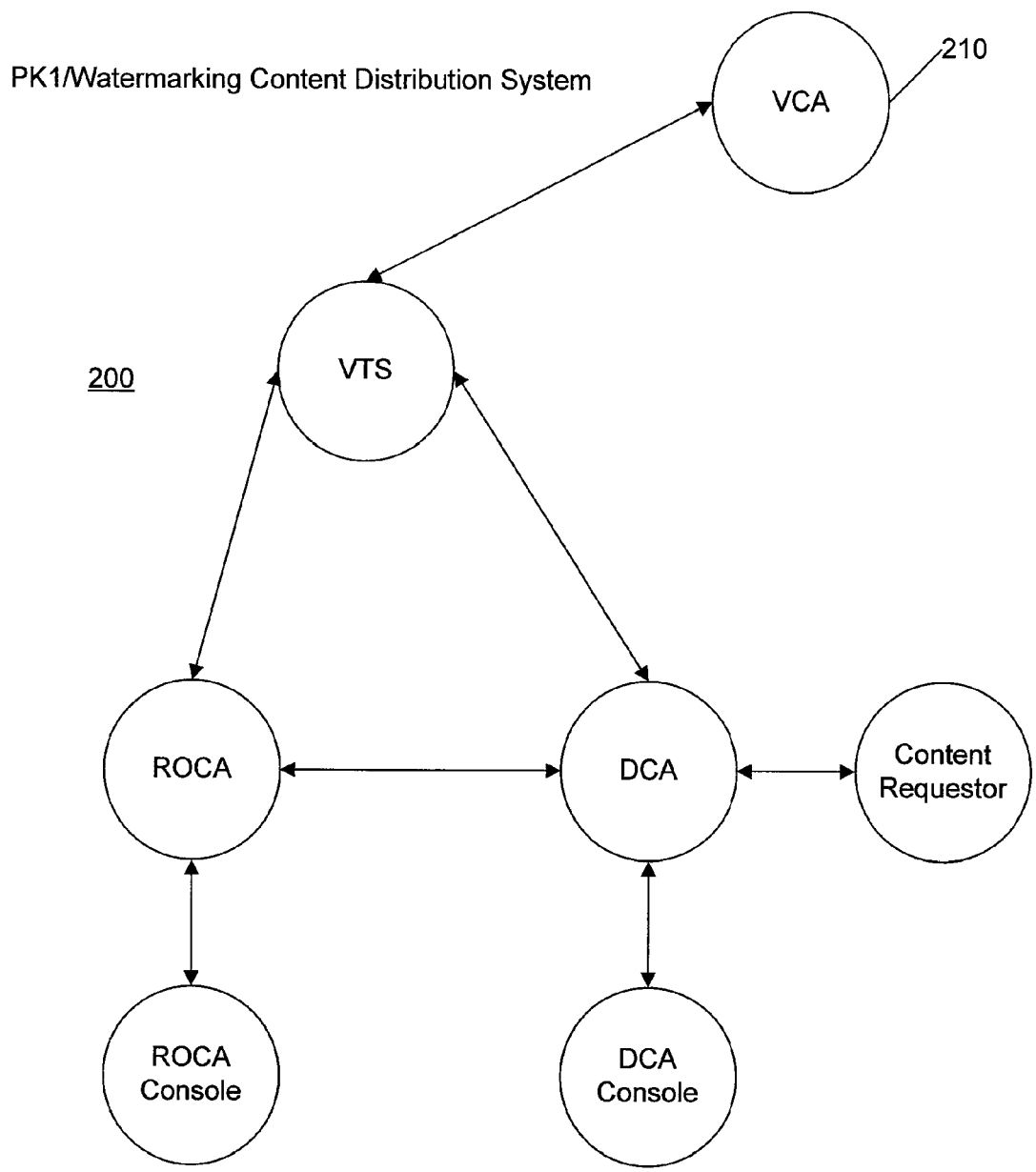
FIG. 2 is a block diagram illustrating one embodiment of a certificate authority in a content distribution system.

FIG. 2 is a block diagram illustrating one embodiment of a certificate authority 210 in a content distribution system 200.

Figure 3:
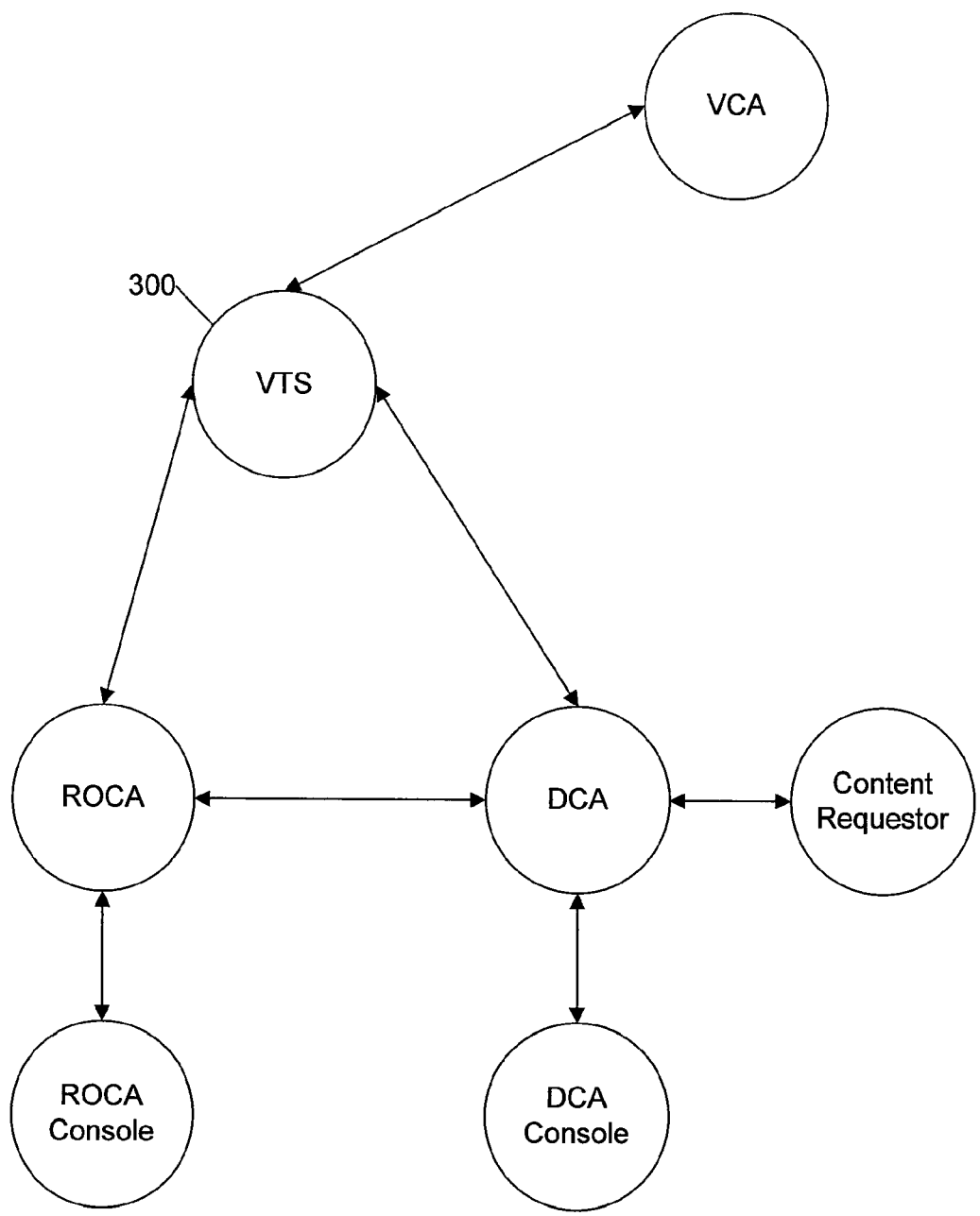
FIG. 3 is a block diagram illustrating one embodiment of a transaction server in the content distribution system.

FIG. 3 is a block diagram illustrating one embodiment of a transaction server 300 in the content distribution system 200.

Figure 4:
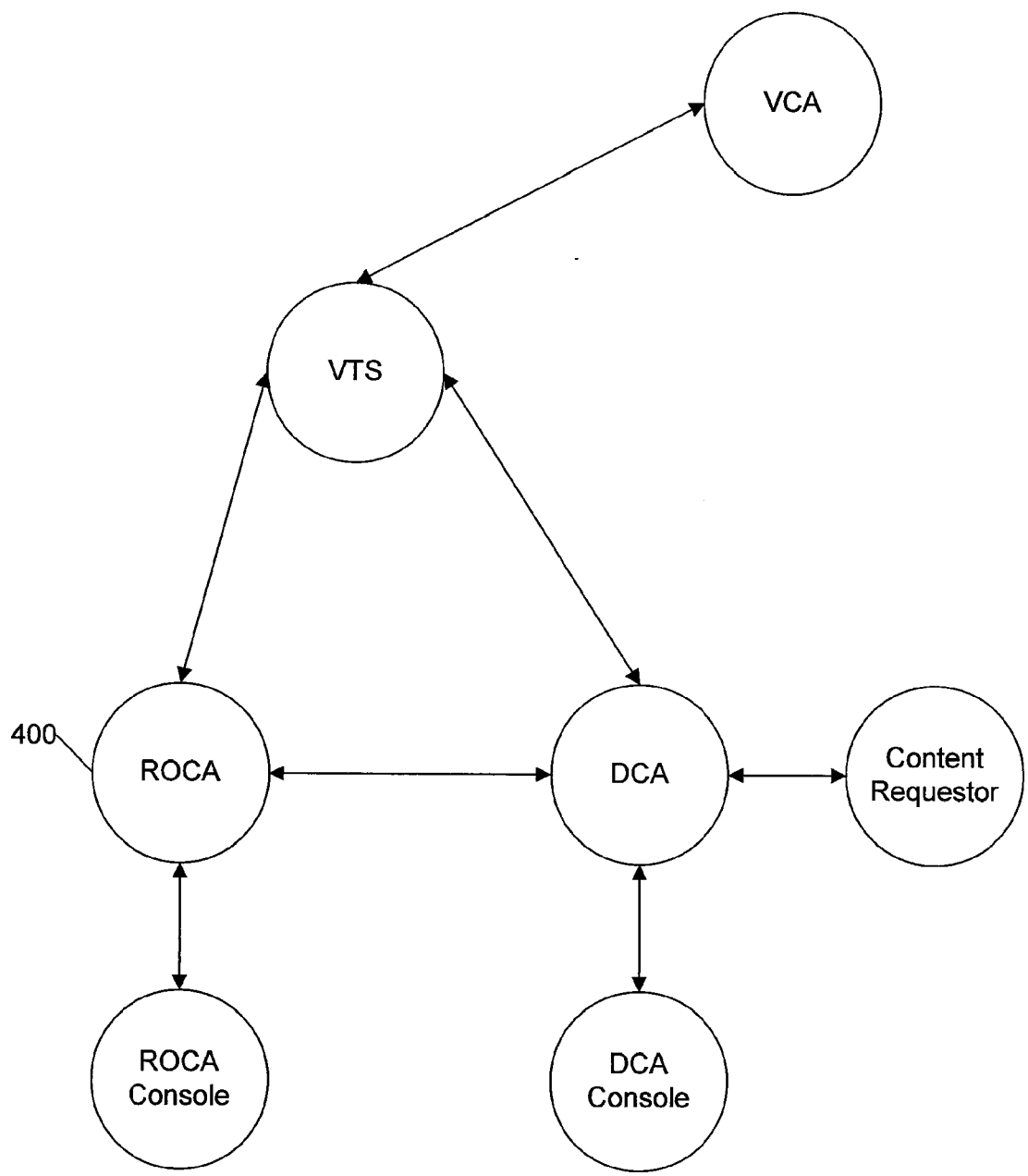
FIG. 4 is a block diagram illustrating one embodiment of a rights owner content authority in the content distribution system.

FIG. 4 is a block diagram illustrating one embodiment of a rights owner content authority 400 in the content distribution system 200.

Figure 5:
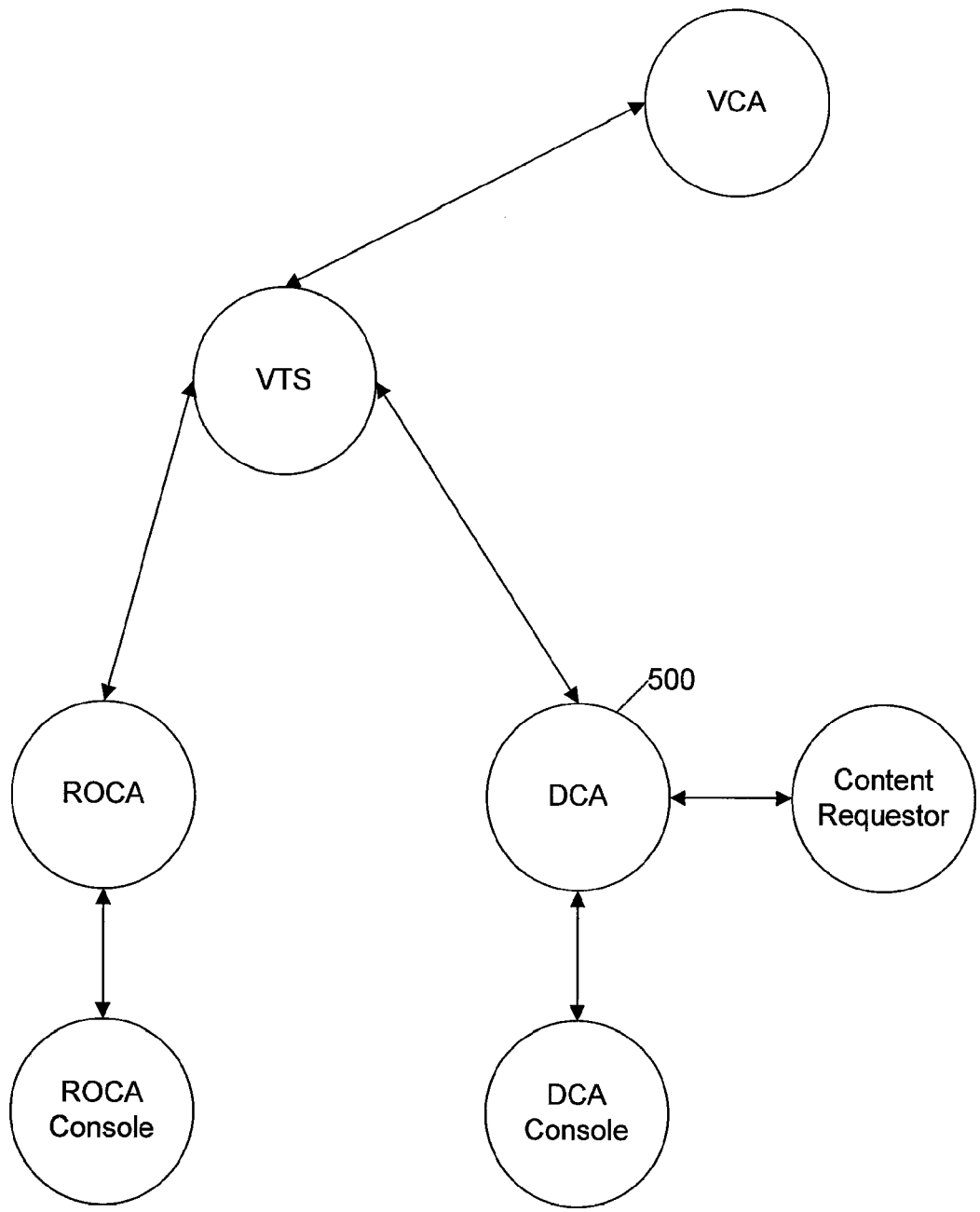
FIG. 5 is a block diagram illustrating one embodiment of a distribution content authority in the content distribution system.

FIG. 5 is a block diagram illustrating one embodiment of a distribution content authority 500 in the content distribution system 200.

Figure 6:
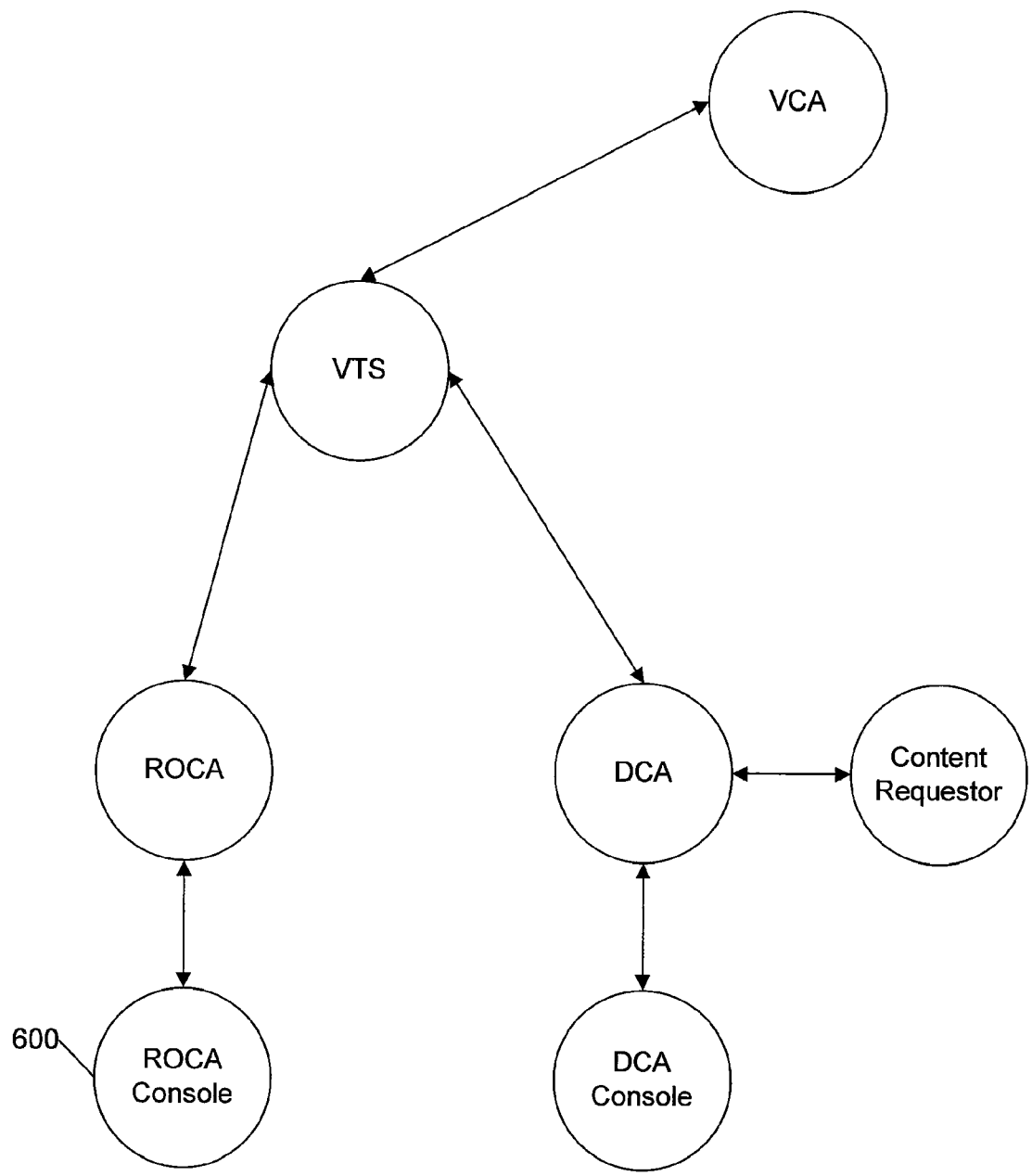
FIG. 6 is a block diagram illustrating one embodiment of a rights owner content authority console of the content distribution system.

FIG. 6 is a block diagram illustrating one embodiment of a rights owner content authority console 600 of the content distribution system 200.

Figure 7:
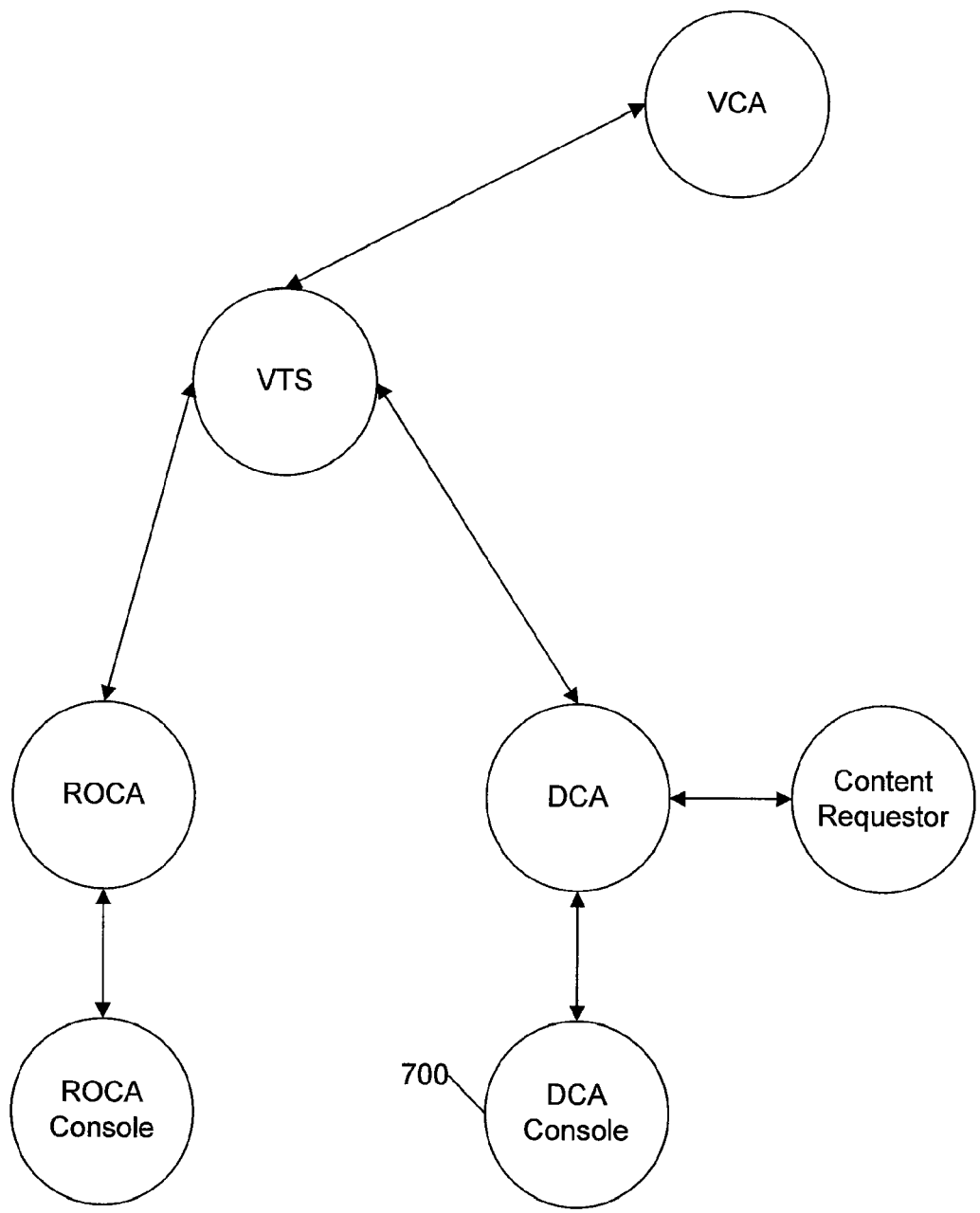
FIG. 7 is a block diagram illustrating one embodiment of a distribution content authority console of the content distribution system.

FIG. 7 is a block diagram illustrating one embodiment of a distribution content authority console 700 of the content distribution system 200.

Figure 8:
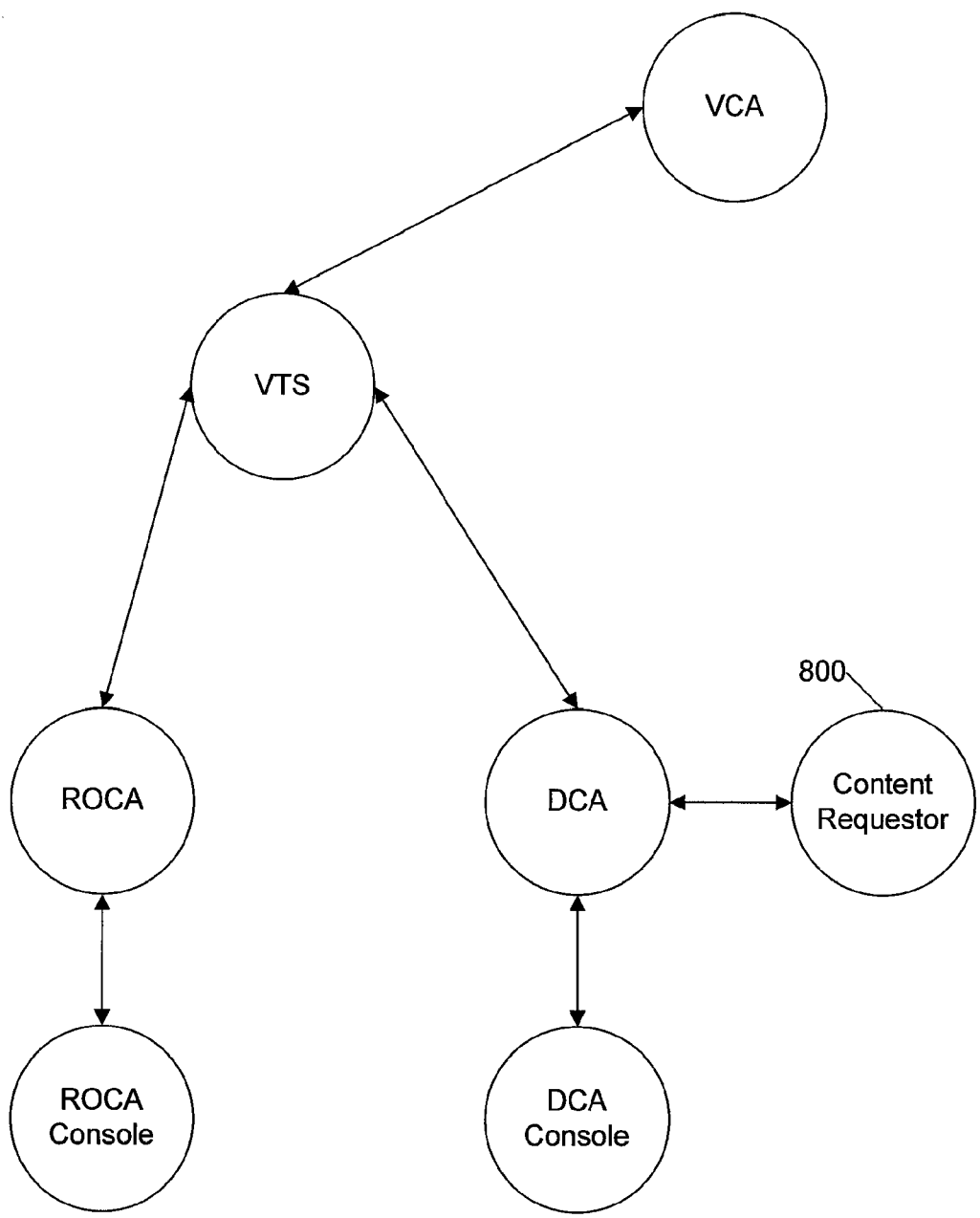
FIG. 8 is a block diagram illustrating one embodiment of a content requestor of the content distribution system.

FIG. 8 is a block diagram illustrating one embodiment of a content requestor 800 of the content distribution system 200.

Figure 9:
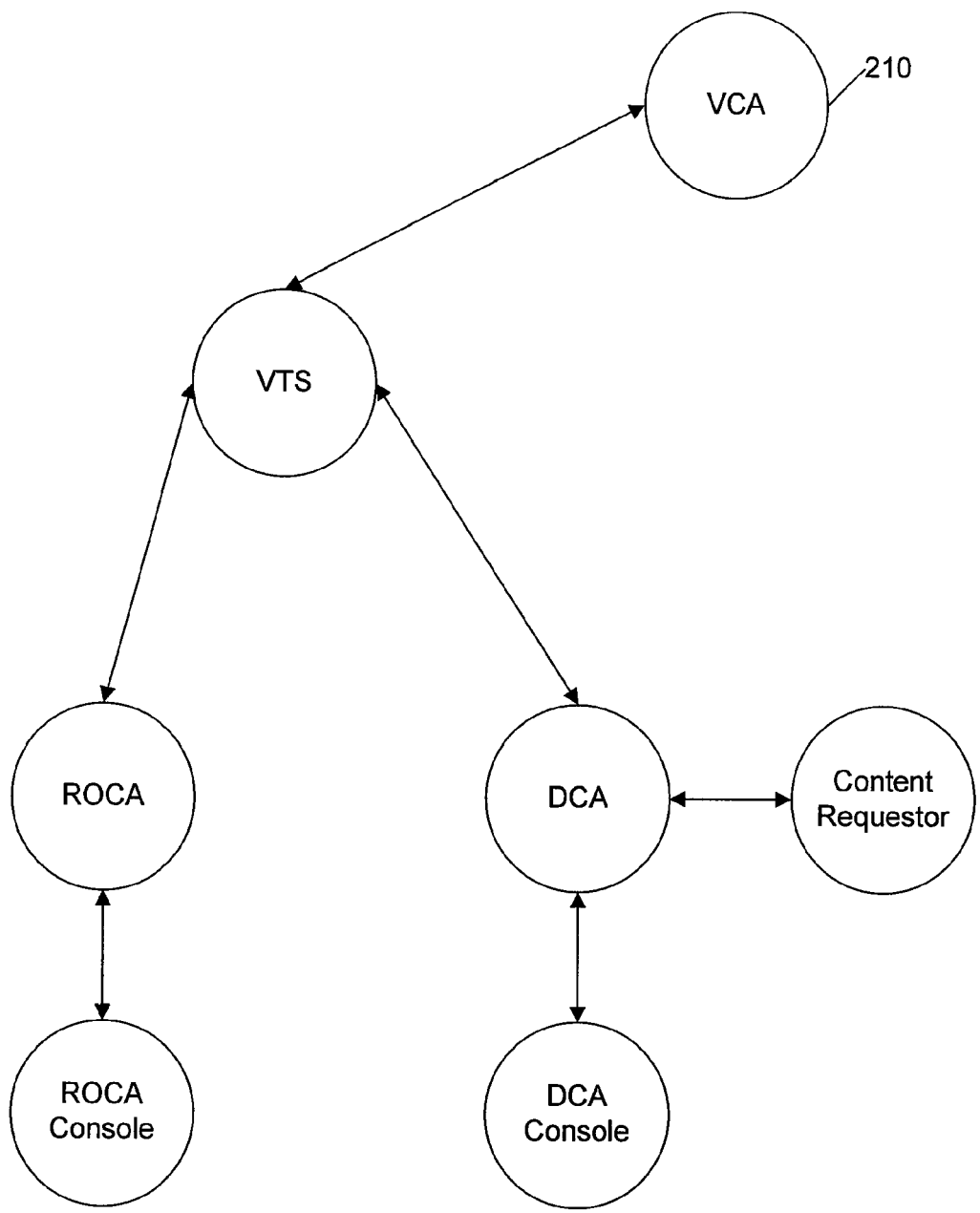
FIG. 9 is a block diagram illustrating another embodiment of the certificate authority shown in FIG. 2.

FIG. 9 is a block diagram illustrating another embodiment of the certificate authority 210 shown in FIG. 2.

Figure 10:
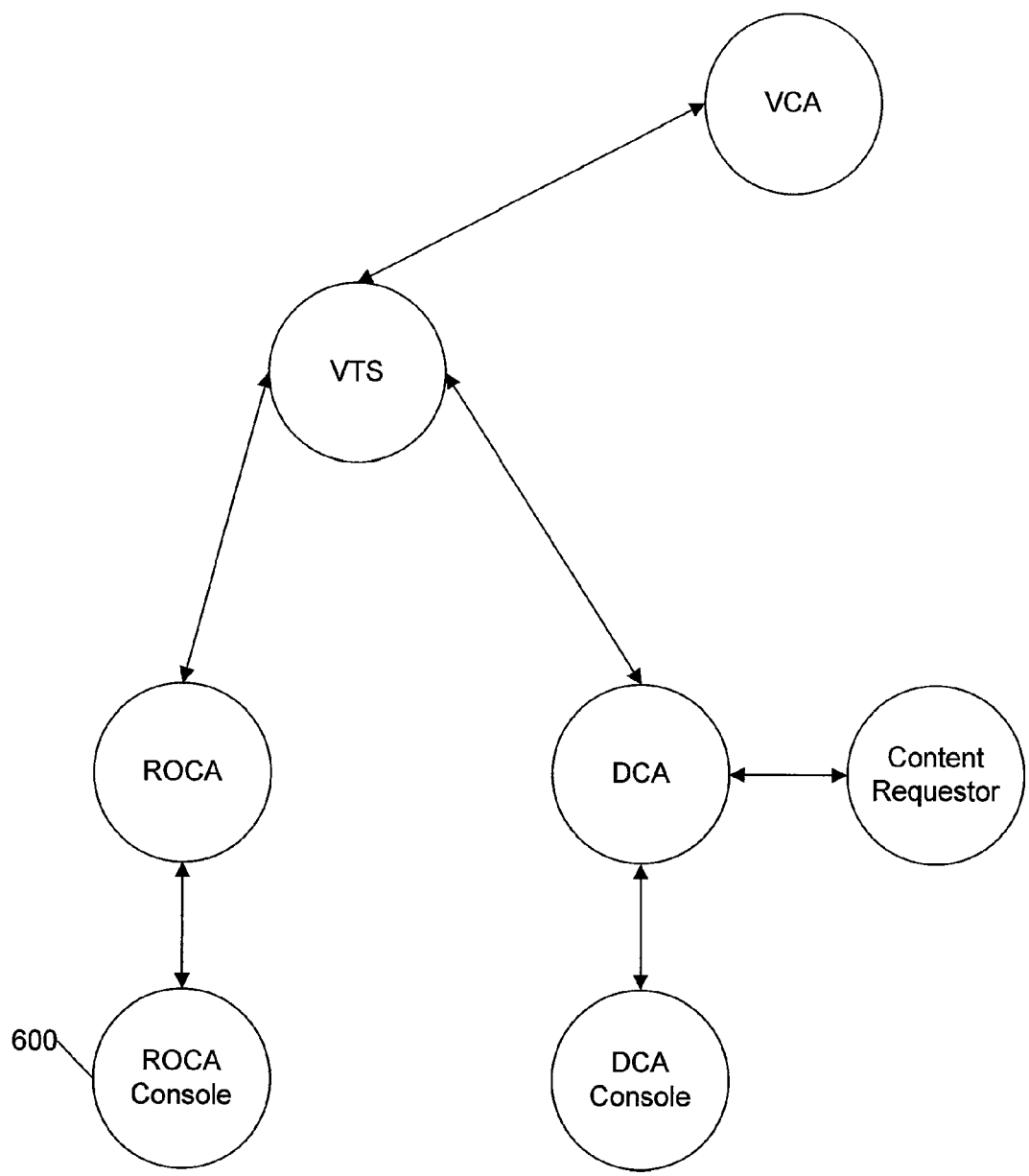
FIG. 10 is a block diagram illustrating another embodiment of the rights owner content authority console shown in FIG. 6.

FIG. 10 is a block diagram illustrating another embodiment of the rights owner content authority console 600 shown in FIG. 6.

Figure 11:
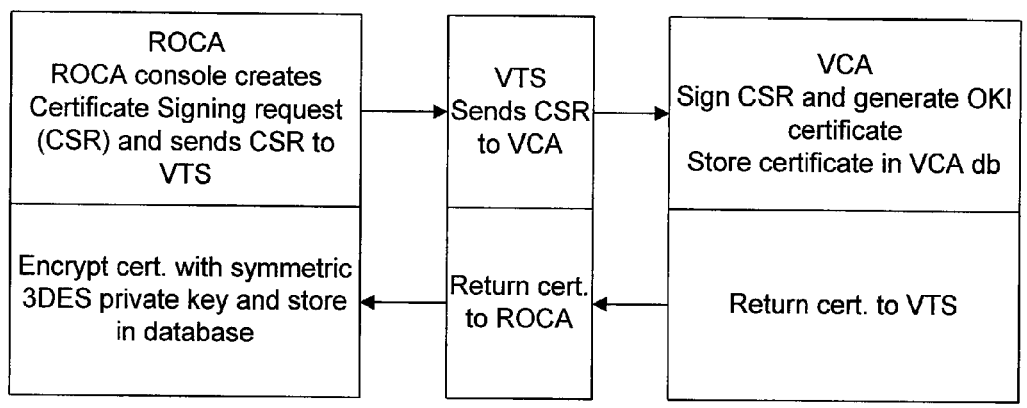
FIG. 11 is a flow diagram illustrating one embodiment of a rights owner content authority sign up operation.

FIG. 11 is a flow diagram illustrating one embodiment of a rights owner content authority sign up operation 1100.

Figure 12:
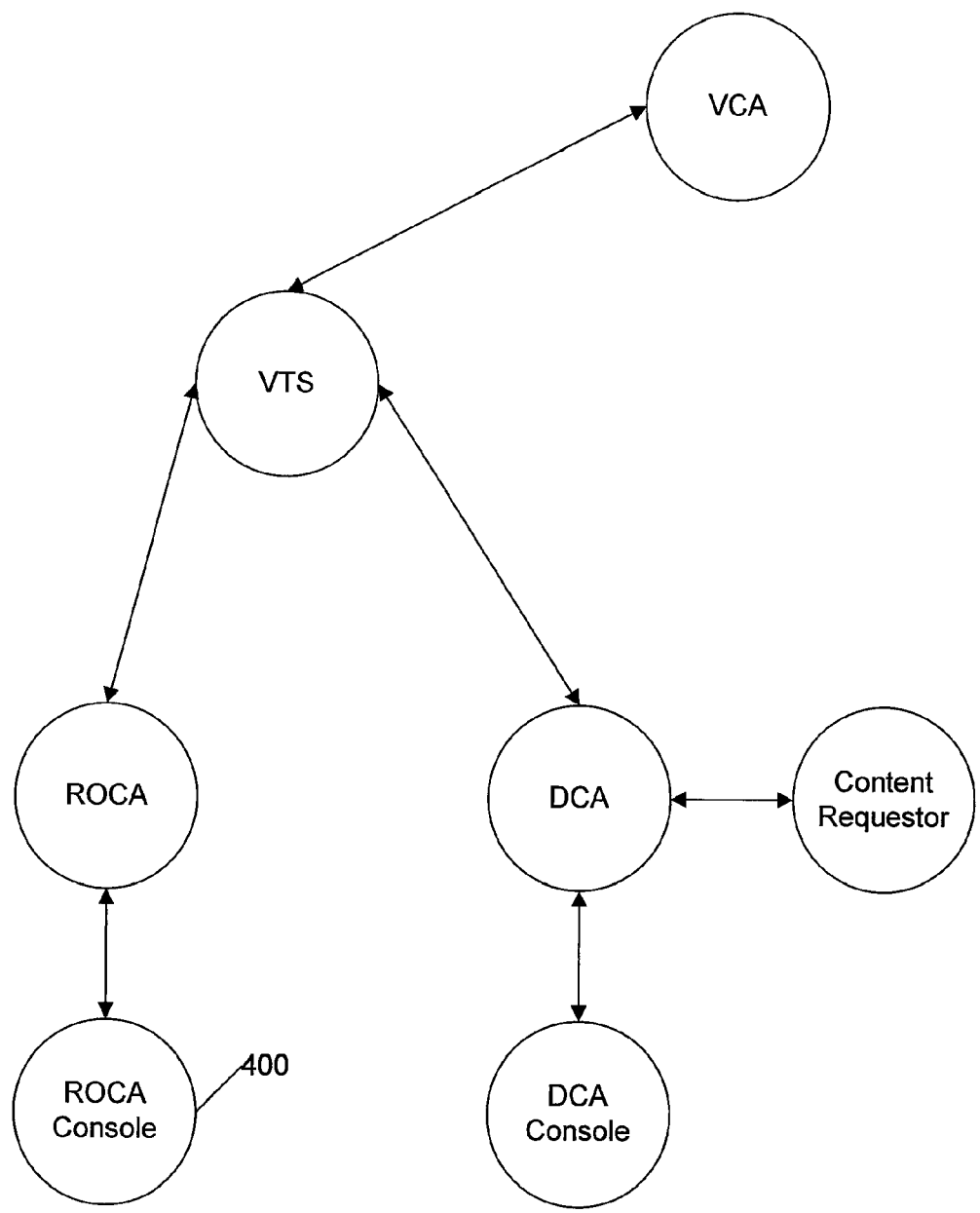
FIG. 12 is a block diagram illustrating another embodiment of the rights owner content authority shown in FIG. 4.

FIG. 12 is a block diagram illustrating another embodiment of the rights owner content authority 400 shown in FIG. 4.

Figure 13:
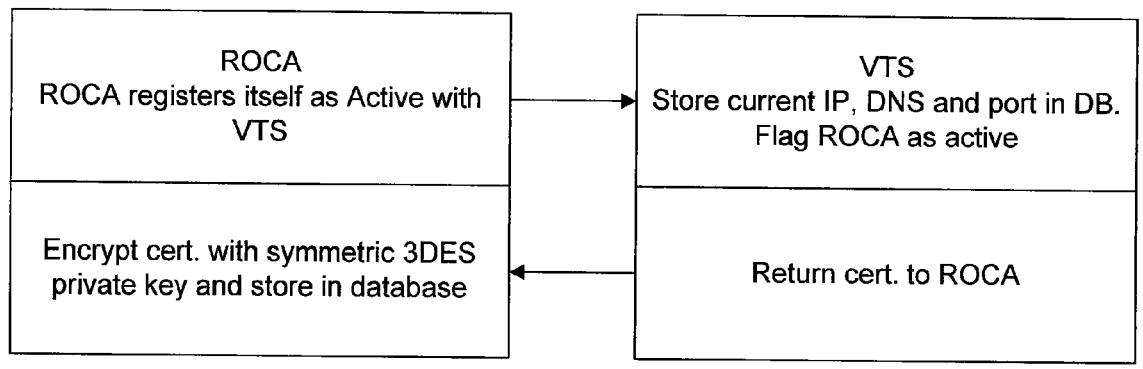
FIG. 13 is a flow diagram illustrating one embodiment of a rights owner content authority initialization operation.

FIG. 13 is a flow diagram illustrating one embodiment of a rights owner content authority initialization operation 1300.

Figure 14:
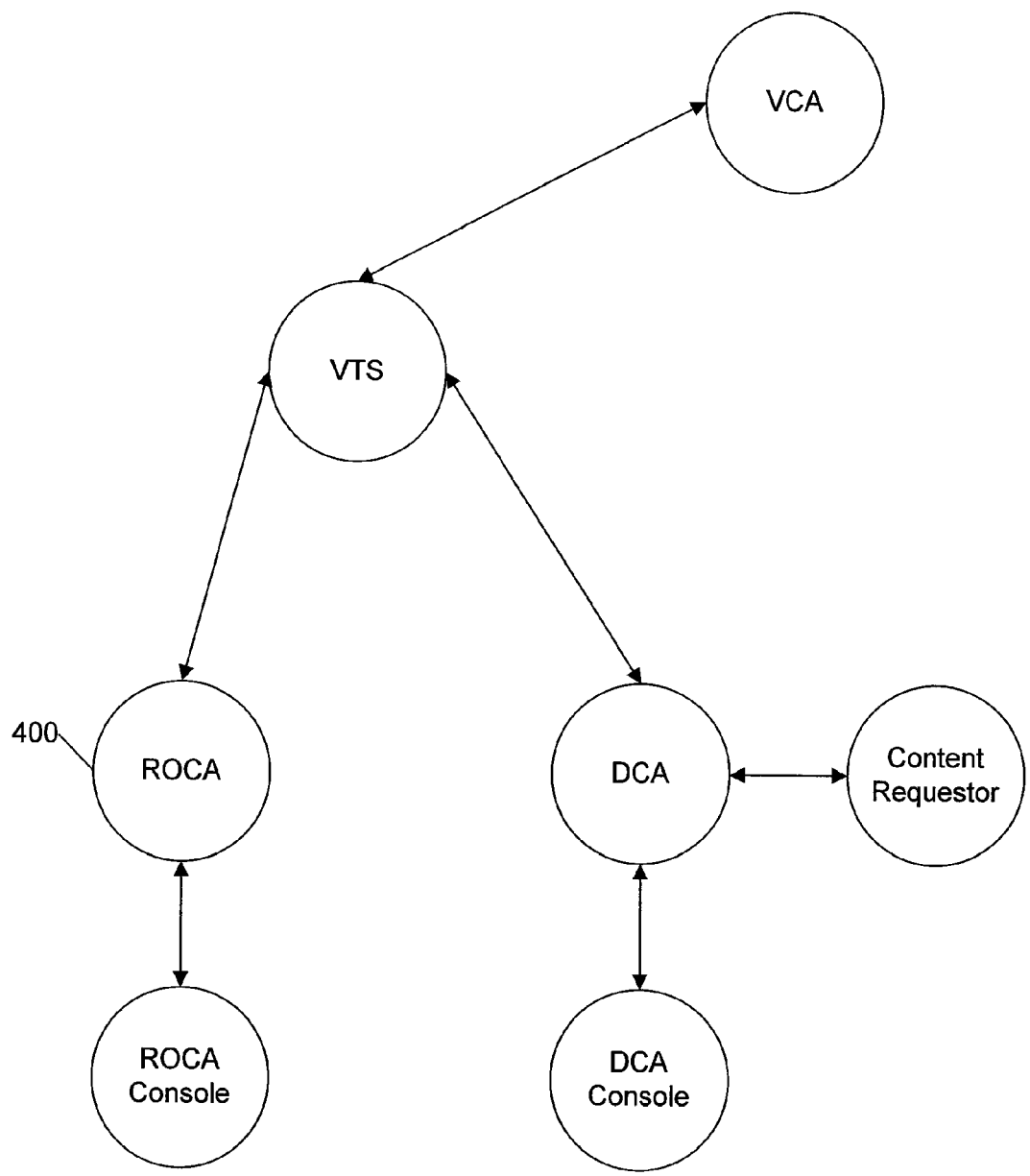
FIG. 14 is a block diagram illustrating another embodiment of the rights owner content authority shown in FIG. 4.

FIG. 14 is a block diagram illustrating another embodiment of the rights owner content authority 400 shown in FIG. 4.

Figure 15:
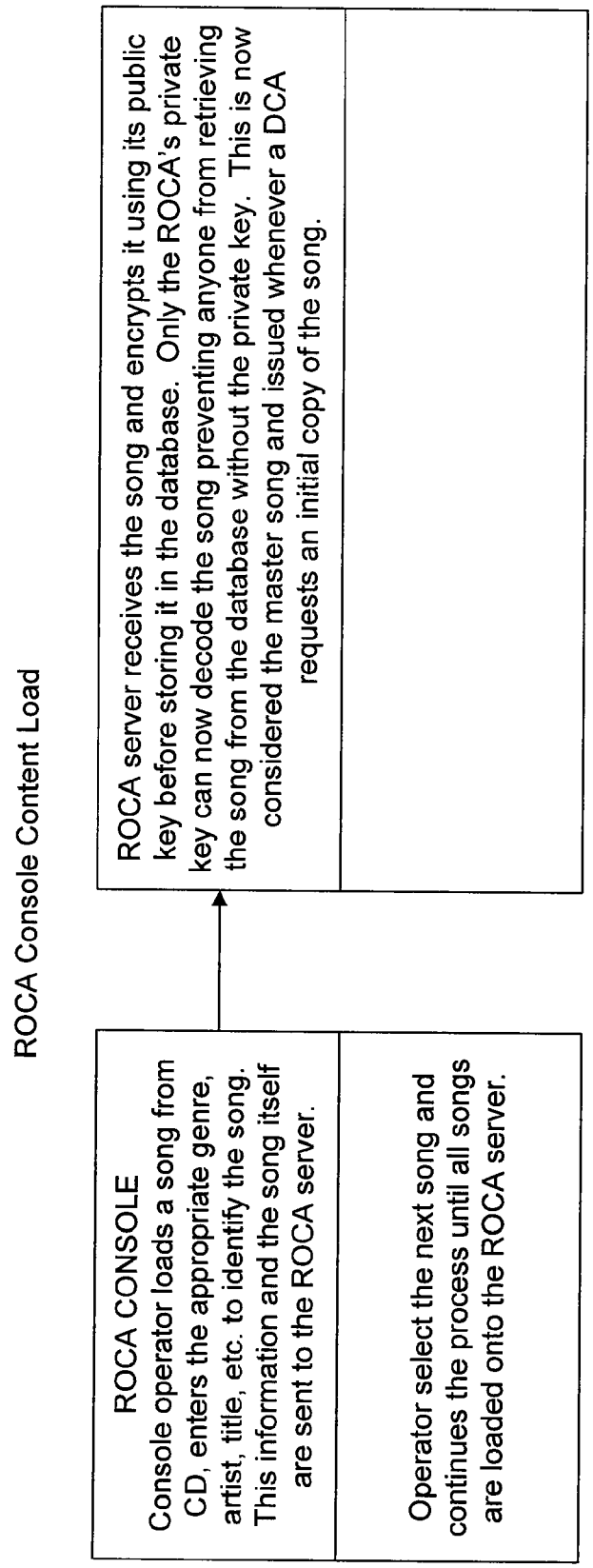
FIG. 15 is a flow diagram illustrating one embodiment of a rights owner content authority console content load operation.

FIG. 15 is a flow diagram illustrating one embodiment of a rights owner content authority console content load operation 1500.

Figure 16:
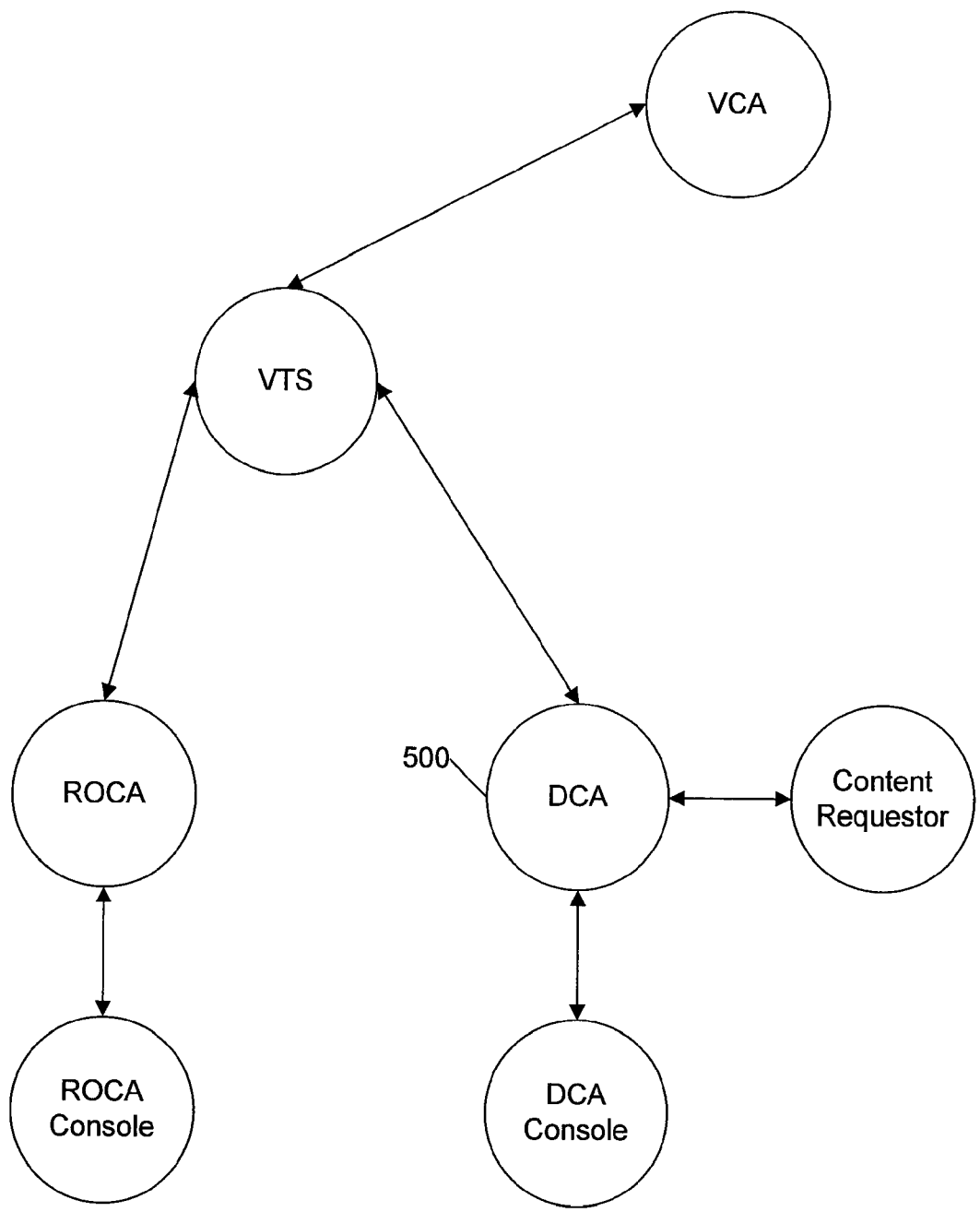
FIG. 16 is a block diagram illustrating another embodiment of the distribution content authority shown in FIG. 5.

FIG. 16 is a block diagram illustrating another embodiment of the distribution content authority 500 shown in FIG. 5.

Figure 17:
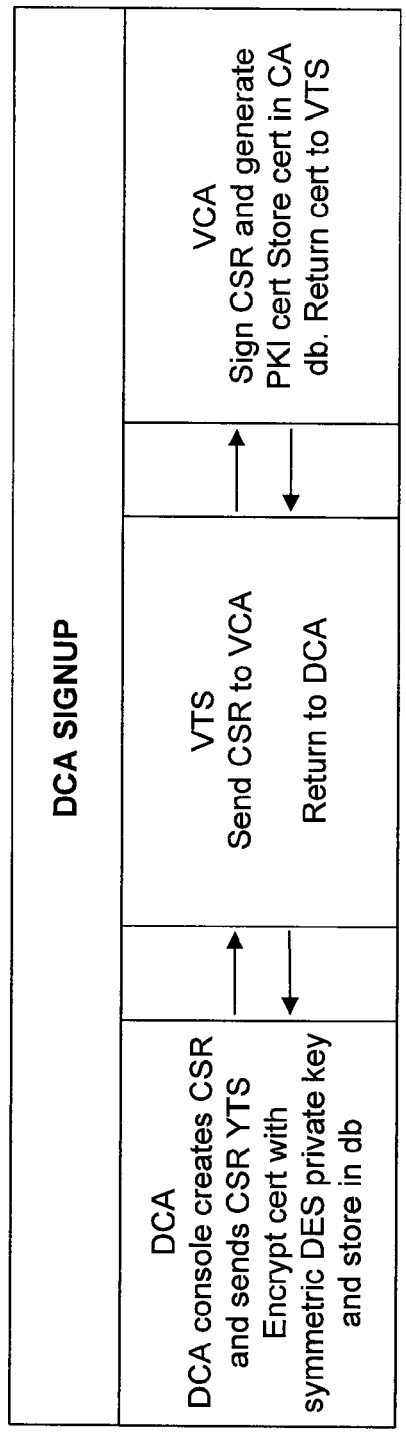
FIG. 17 is a flow diagram illustrating one embodiment of a distribution content authority sign up operation.

FIG. 17 is a flow diagram illustrating one embodiment of a distribution content authority sign up operation 1700.

Figure 18:
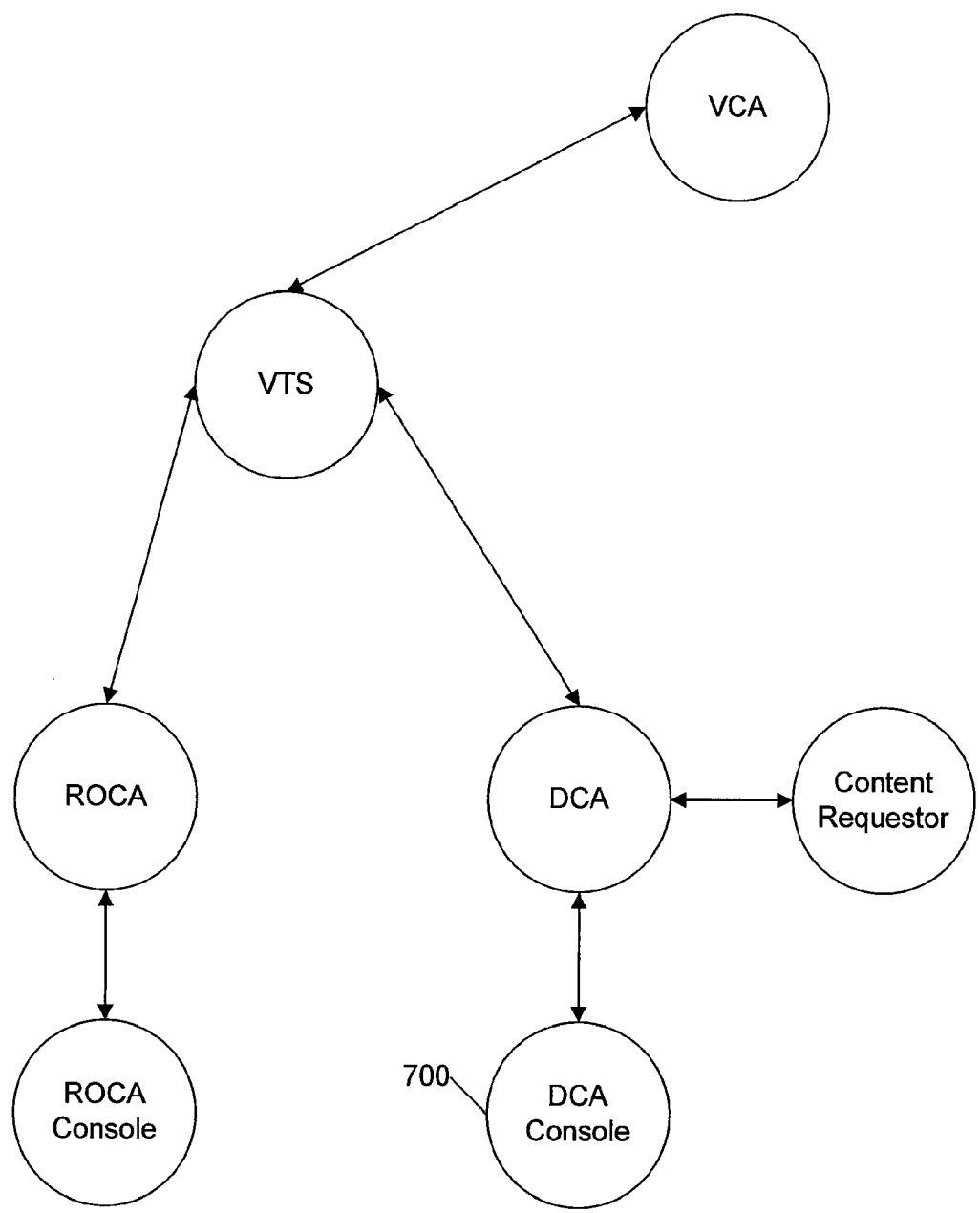
FIG. 18 is a block diagram illustrating another embodiment of the distribution content authority console shown in FIG. 7.

FIG. 18 is a block diagram illustrating another embodiment of the distribution content authority console 700 shown in FIG. 7.

Figure 19:
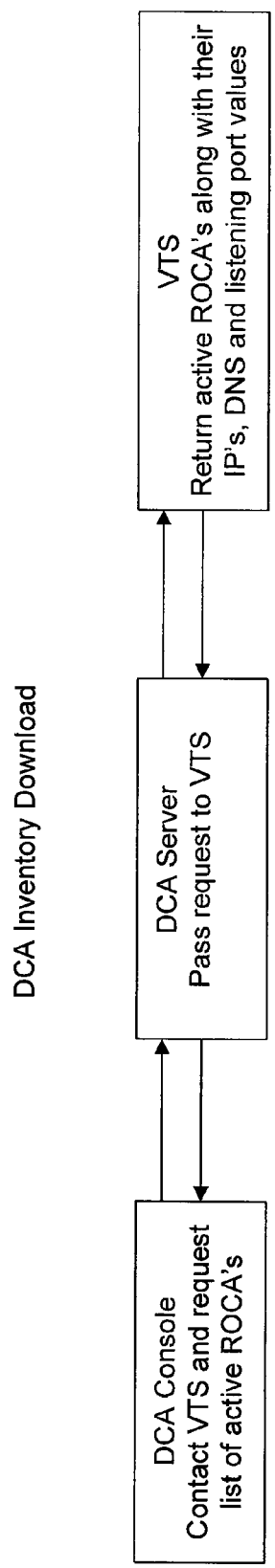
FIG. 19 is a flow diagram illustrating one embodiment of a distribution content authority inventory load operation.

FIG. 19 is a flow diagram illustrating one embodiment of a distribution content authority inventory load operation 1900.

Figure 20:
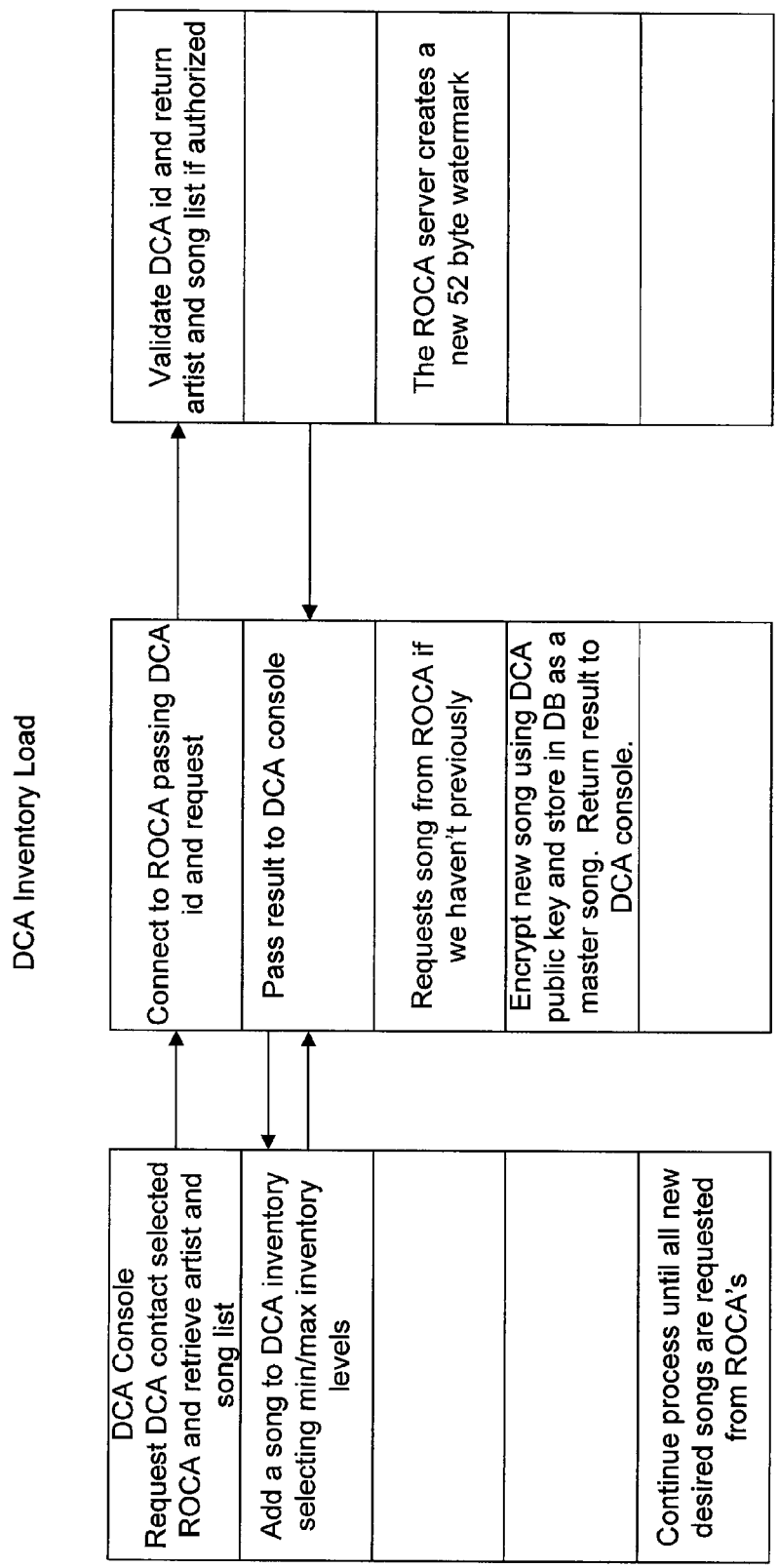
FIG. 20 is a flow diagram illustrating another embodiment of the distribution content authority inventory load operation shown in FIG. 19.

FIG. 20 is a flow diagram illustrating another embodiment of the distribution content authority inventory load operation 1900 shown in FIG. 19.

FIG. 21 is a flow diagram illustrating another embodiment of the distribution content authority inventory load operation 1900 shown in FIGS. 19 and 20.

FIG. 22 is a block diagram illustrating another embodiment of the distribution content authority 500 shown in FIG. 5.

FIG. 23 is a block diagram illustrating another embodiment of the content requestor 800 shown in FIG. 8.

FIG. 24 is a block diagram illustrating another embodiment of the various components of the content distribution system 200 shown in FIGS. 2 through 8.

FIG. 25 is a block diagram illustrating another embodiment of the content requestor 800 shown in FIG. 8.

What is claimed is:

1. A system for protecting the ownership rights of digital content files distributed to consumers comprising:
   a certificate authority configured to issue and maintain digital certificates;
   a transaction server configured to issue watermark transaction identifiers and store the corresponding transaction information;
   a rights owner content authority configured to receive one of said watermark transaction identifiers and distribute a digital content file that includes a first watermark generated from a digital certificate which identifies a distribution content authority and one of said watermark transaction identifiers;
   wherein the distribution content authority configured to receive said digital content file, receive another of said watermark transaction identifiers and generate a second watermark that identifies a content requestor and another of said watermark transaction identifiers, and distribute the digital content file that includes said second watermark; and
   a content requester configured to receive said digital content file that includes said first and second watermarks and distribute said digital content file to an authorized consumer.

2. The system as defined in claim 1, further comprising a rights owner content authority console configured to provide a graphical user interface with said rights owner content authority.

3. The system as defined in claim 1, further comprising a distribution content authority console configured to provide a graphical user interface with said distribution content authority.

4. A method for protecting the ownership rights of digital content files distributed to consumers comprising:
   issuing and maintaining a digital certificate;
   issuing transaction identifiers and storing the corresponding transaction information;
   generating by a rights owner content authority a first watermark generated from said digital certificates which identifies a distribution content authority and from one of said transaction identifiers;

distributing a digital content file that includes said first watermark to the distribution content authority;

generating by the distribution content authority a second watermark that identifies a content requestor and includes another one of said transaction identifiers;

distributing the digital content file that includes said second watermark and said first watermark to an authorized consumer.

* * * * *

(12) EX PARTE REEXAMINATION CERTIFICATE (6710th)
United States Patent
Cooper et al.

(10) Number: US 7,240,196 C1
(45) Certificate Issued: Mar. 17, 2009

(54) METHOD AND SYSTEM FOR PROTECTING OWNERSHIP RIGHTS OF DIGITAL CONTENT FILES

(75) Inventors: Robin Ross Cooper, La Mesa, CA (US); Robert T. Kulakowski, Santa Fe, CA (US)

(73) Assignee: Verimatrix, Inc., San Diego, CA (US)

Reexamination Request:
No. 90/010,028, Sep. 19, 2007

Reexamination Certificate for:
Patent No.: 7,240,196
Issued: Jul. 3, 2007
Appl. No.: 10/177,263
Filed: Jun. 19, 2002

Related U.S. Application Data

(60) Provisional application No. 60/300,168, filed on Jun. 22, 2001.

(51) Int. Cl.
*H04L 29/00* (2006.01)

(52) U.S. Cl. .................................................... 713/156
(58) Field of Classification Search ................... None
See application file for complete search history.

(56) References Cited

U.S. PATENT DOCUMENTS

| 6,398,245 B1 | 6/2002 | Gruse et al. ............... 380/228 |
| 2001/0037465 A1 | 11/2001 | Hart, III ................... 713/176 |
| 2002/0168082 A1 | 11/2002 | Rasdan ...................... 382/100 |

*Primary Examiner*—Pia Tibbits

(57) ABSTRACT

A system and method for providing protection of ownership rights of digital content files while also providing distribution of the content files to consumers that are authorized to receive the digital content files. A system and method for preventing or deterring the unauthorized distribution of digital content files. Several possible protection schemes include, for example, proactive protections such as encryption, SSL or VPN technologies, and reactive protections such as watermarking, PKI, piracy watch systems, or legal action management.

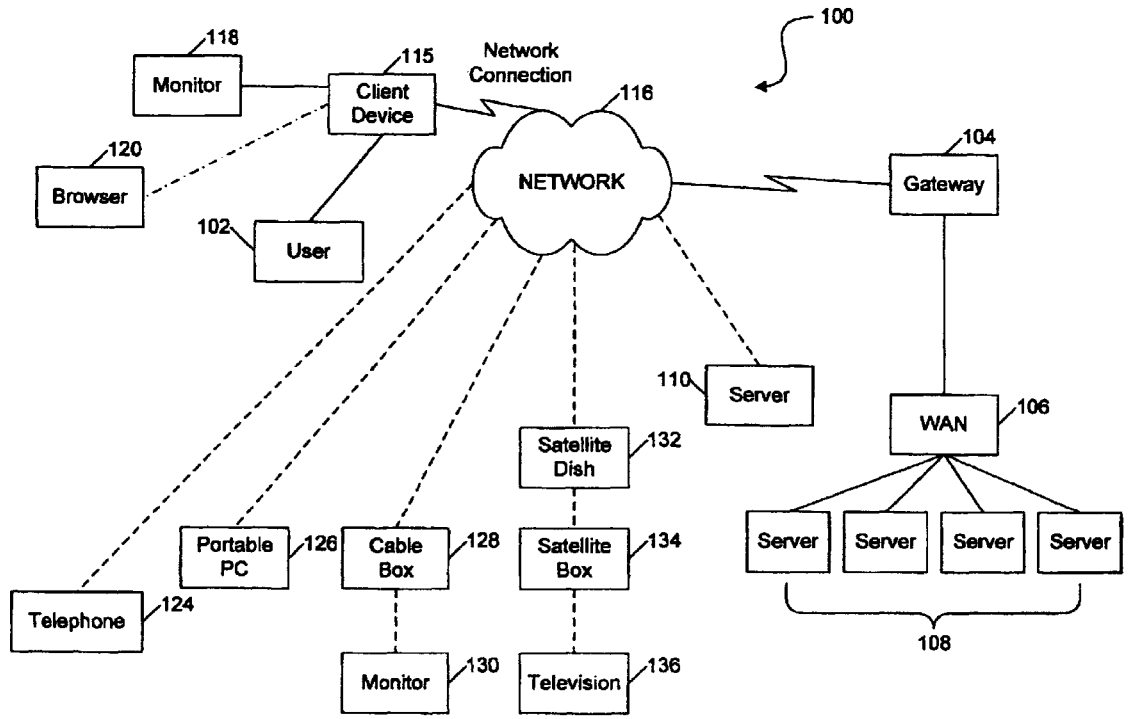

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2 and 3, dependent on an amended claim, are determined to be patentable.

1. A system for protecting the ownership rights of digital content files distributed to consumers comprising:
    a certificate authority configured to issue and maintain digital certificates;
    a transaction server configured to *receive requests for watermark transaction identifiers from a plurality of sources,* issue watermark transaction identifiers and store the corresponding transaction information;
    a rights owner content authority configured to receive one of said watermark transaction identifiers and distribute a digital content file that includes a first watermark generated from a digital certificate which identifies a distribution content authority and one of said watermark transaction identifiers;
    wherein the distribution content authority *is* configured to receive said digital content file, receive another of said watermark transaction identifiers and generate a second watermark that identifies a content requestor and another of said watermark transaction identifiers, and distribute the digital content file that includes said second watermark; and
    [a] *the* content [requester] *requestor* configured to receive said digital content file that includes said first and second watermarks and distribute said digital content file to an authorized consumer.

4. A method for protecting the ownership rights of digital content files distributed to consumers comprising:
    issuing and maintaining a digital certificate;
    *receiving requests for transaction identifiers from a plurality of sources,* issuing transaction identifiers *to the plurality of sources* and storing the corresponding transaction information;
    generating by a rights owner content authority a first watermark generated from said digital certificates which identifies a distribution content authority and from one of said transaction identifiers;
    distributing a digital content file that includes said first watermark to the distribution content authority; *and*
    generating by the distribution content authority a second watermark that identifies a content requestor and includes another one of said transaction identifiers;
    distributing the digital content file that includes said second watermark and said first watermark to an authorized consumer.

* * * * *